United States Patent [19]

Mochida et al.

[11] 4,448,828
[45] May 15, 1984

[54] CERAMIC HONEYCOMB STRUCTURAL BODIES

[75] Inventors: Shigeru Mochida, Kasugai; Masaru Kojima, Nagoya, both of Japan

[73] Assignee: NGK Insulators, Ltd., Nagoya, Japan

[21] Appl. No.: 278,580

[22] Filed: Jun. 29, 1981

[30] Foreign Application Priority Data

Jul. 11, 1980 [JP] Japan ................................. 55-93785

[51] Int. Cl.³ ............................................... B32B 3/20
[52] U.S. Cl. ..................................... 428/36; 428/116; 428/117; 428/118
[58] Field of Search ..................... 252/477 R; 428/116, 428/117, 118, 36

[56] References Cited

U.S. PATENT DOCUMENTS

| | | | |
|---|---|---|---|
| 3,790,654 | 2/1974 | Bagley | 428/116 X |
| 3,824,196 | 7/1974 | Benbow et al. | 428/116 X |
| 3,853,485 | 12/1974 | Hogan | 428/118 X |
| 3,903,341 | 9/1975 | Gerhold | 428/116 |
| 3,983,283 | 9/1976 | Bagley | 428/116 |
| 4,127,691 | 11/1978 | Frost | 428/116 |
| 4,135,018 | 1/1979 | Bonin et al. | 428/116 |
| 4,233,351 | 11/1980 | Okumura et al. | 428/116 |
| 4,323,614 | 4/1982 | Gulati | 428/116 |

FOREIGN PATENT DOCUMENTS 50-26146  3/1975  Japan .
50-70155  6/1975  Japan .
1579263  11/1980  United Kingdom .

Primary Examiner—Marion McCamish
Attorney, Agent, or Firm—Parkhurst & Oliff

[57] ABSTRACT

This invention discloses ceramic honeycomb structural bodies having high thermal shock resistance and mechanical strength in which partition walls forming numerous parallel channels of the honeycomb structural bodies and/or connecting portions of the partition walls are constructed so as to have flexibility. The flexibility allows thermal stress generated in the honeycomb structural bodies to be absorbed. The bodies are characterized in that a given area of outer circumferential annular portion of said ceramic honeycomb structural bodies has a structure having a higher rigidity than the inner portion.

7 Claims, 14 Drawing Figures

CERAMIC HONEYCOMB STRUCTURAL BODIES

The present invention relates to ceramic honeycomb structural bodies to be used for catalyst supports for purifying automotive exhaust gases, catalyst supports for removing odor or heat exchanging structural bodies, and more particularly to ceramic honeycomb structural bodies having excellent thermal shock resistance.

Ceramic honeycomb structural bodies are generally ones which conduct a catalytic reaction, heat exchange and the like during the course where a fluid having a high temperature flows through a large number of channels and said structural bodies have a low pressure loss, endure high temperatures, have large geometric surface areas and are light weight. Thus, these bodies have recently been broadly used.

However, when the conditions under which such bodies are used are severe, strong thermal shock due to rapid heating and quenching is applied to the honeycomb structural body and breakage may occur. In particular, an unbalance of heat of reaction occurs due to nonuniform flow of exhaust gas and a larger gas flow at the central portion while the outer circumferential portion is maintained at lower temperature due to cooling by ambient air, so that a thermal stress is generated in the cross section and the compressive stress and the tensile stress are generated at the central portion and the outer circumferential portion respectively.

In general, ceramic is strong against compressive stress but is weak against tensile stress, so that when tensile stress at the outer circumferential portion due to the temperature distribution exceeds the breaking strength of the ceramic honeycomb structural body, the honeycomb structural body is broken.

Therefore, attempts have been made to lower the thermal expansion coefficient of ceramic honeycomb structural bodies to reduce the generated stress and to increase the mechanical strength, but satisfactory results have not been obtained.

As disclosed in U.S. Pat. No. 3,983,283 and Japanese Utility Model Laid Open Specification Nos. 26,146/75 and 70,155/75, it has been proposed that slits be provided in a longitudinal direction at the outer peripheral wall or the partition walls forming the channels of the outer circumferential portion in order to reduce the generated stress, but the result has been that mechanical strength is deteriorated and there are many problems in the practical use.

Furthermore, as seen in U.S. Pat. No. 4,127,691, U.S. Pat. No. 4,135,018 and G.B. Pat. No. 1,579,263, structures have been disclosed in which the flexibility of the partition walls forming the channels and the connected portions of the partition walls is increased in order to absorb stress, when the stress is applied to a honeycomb structural body. That is, such structures are ones as shown in FIGS. 1–7, and when these structures are subjected to thermal expanding or shrinking stress (for example, when a shrinking stress W is applied as shown in FIGS. 2a, 5a and 7a), the partition walls or connected portions of partition walls are easily deformed as shown by dotted lines, and they have the flexible structures easily absorbing the thermal stress.

However, these structures absorb stress due to thermal shock and the thermal shock resistance is improved, but these structures are very weak against a mechanical external force because of their own flexible structure. When these ceramic honeycomb structural bodies are held in a holder, a specific device is necessary, and in certain cases, these honeycomb structural bodies cannot be used as a practical matter.

Moreover, in ceramic honeycomb structural bodies having a flexible structure, when they are produced they are flexible and have no rigidity and strength, so that these structural bodies are greatly deformed by a small force in the course of production. This means that it is necessary to take various precautions in view of production installation, and nevertheless, an excessive deformation may occur and the yield is low.

On the other hand, as a device for improving the above described defect of rigidity and strength, if the channels of the outer circumferential portion of the ceramic honeycomb structural bodies having the flexible structure are modified in a structure wherein these channels are not flexible but are rigid, it has been generally considered that the aimed thermal shock resistance is noticeably deteriorated and the inventors also have considered that it is difficult to concurrently improve both the thermal shock resistance and the mechanical strength in view of the structure of the ceramic honeycomb structural body. The present invention has been accomplished based on experimental results which are contrary to the above described concept, and relates to ceramic honeycomb structural bodies which have a thermal shock resistance substantially equal to prior flexible ceramic honeycomb structural bodies having excellent thermal shock resistance, and in addition, the applicants' bodies have far greater mechanical strength. These bodies comprise ceramic honeycomb structural bodies in which the partition walls and/or the connecting portions of the partition walls forming a large number of parallel channels separated by thin walls of substantially uniform thickness are made to be flexible, whereby thermal stress caused in the ceramic honeycomb structural bodies is absorbed, characterized in that a given outer circumferential annular area portion in the ceramic honeycomb structural bodies is constructed with a cell shape having higher rigidity than the inner portion.

The structure of the channels (referred to as "cell" hereinafter) of the outer circumferential annular portion is preferred to be a generally broadly used square shape, but may be of a triangle shape having the highest rigidity. The central portion may be cell shapes other than square, for example, "rectangular cell," "T-shaped cell," "L-shaped cell," "+-shaped (or greek cross-shaped) cell," "Z-shaped cell," "bow-tie-shaped cell," "combination cell of convex partition wall and concave partition wall" and the like.

One embodiment of preferred experimental results showing improvement of both thermal shock resistance and mechanical strength according to the present invention comprises an outer circumferential annular portion which is constructed with a cell structure having a high rigidity, as is shown in FIG. 8. This result has been obtained with respect to a ceramic honeycomb structural body having a circular cross section composed of a central portion having rectangular cell structure and an outer circumferential annular portion having usually well used square cell structure and having a diameter of 100 mm and a length of 100 mm. FIG. 8 also shows the results when the whole cross section is constructed with rectangular cells or square cells.

The abscissa in FIG. 8 shows a ratio of area of the outer circumferential annular portion formed of the above described square cell structure to the cross-sectional area of the ceramic honeycomb structural body in percentage, and the ordinate shows the properties obtained in the test methods illustrated in the Examples mentioned hereinafter with respect to thermal shock resistance and mechanical strength. As seen from FIG. 8, the thermal shock resistance, when the area ratio of the outer circumferential annular portion composed of the square cell having a high rigidity is increased, gradually decreases to a point of the ratio of 100%, meaning that the whole cross section of the ceramic honeycomb structural body is formed of square cells as shown in FIG. 11, but in the case where this ratio is less than about 35%, that is in the honeycomb structural body shown in FIG. 10, the decreasing ratio is slight and such honeycomb structural bodies show substantially the same property as when the ratio is 0%, that is, in the case where the whole cross section is constructed with rectangular cells (FIG. 9).

While the mechanical strength increases from the ratio of 0% to 100%, and within a range where the above described ratio is small, for example, between 0% and 10%, the curve suddenly rises up. Accordingly, the effect of constructing the annular portion with square cells having a high rigidity in the present invention is preferred in the area ratio of the annular portion of more than 10% in view of the mechanical strength.

Thus, the level of both the properties is essentially varied by the above described area ratio of the annular portion, but if the ratio is properly selected, the ceramic honeycomb structural bodies having both excellent properties can be obtained.

The above described ratio may be properly selected depending upon the use condition of the ceramic honeycomb structural bodies and the condition of the used cell structure.

For better understanding of the invention, reference is taken to the accompanying drawings, wherein.

The following examples are given for the purpose of illustration of this invention and are not intended as limitations thereof.

EXAMPLES

By using ceramic honeycomb structural bodies having a circular cross section, a diameter of 100 mm, a length of 100 mm, and various cell shapes, the thermal shock resistance and mechanical strength were tested and the results obtained are shown in the following Table 1. The thermal shock resistance and mechanical strength were tested as follows.

To a catalytic converter provided with the above described ceramic honeycomb structural body sample through a given supporter in a given holder, were fed a combustion gas having a high temperature of given temperature and hot air having a constant temperature of about 100° C. alternatively in 20 cycles, in one cycle the combustion gas and the hot air being fed for 5 minutes respectively. Then, the sample was taken out from the catalytic converter and observed to check breakage. When the sample was not broken, the temperature of the combustion gas was further raised 25° C. and the above described test was carried out and the test was repeated until the breakage occurred and the temperature at which the breakage occurs was determined, and said temperature was referred to as a temperature of thermal shock breakage resistance, and the thermal shock resistance was indicated by this temperature. The mechanical strength was determined as follows. The above described sample was sealed in a thin rubber vessel and then charged in a pressure vessel and isotactic pressure was increased. The pressure at which the sample was broken was determined, and the mechanical strength was indicated by the isotactic pressure value at which the breakage occurs.

TABLE 1

| | Construction of cell shape | | Cell density (number/in²) | | Thermal shock resistance | Mechanical strength (kg/cm²) |
| --- | --- | --- | --- | --- | --- | --- |
| | Central portion | Outer circumferential annular portion | Central portion | Outer circumferential annular portion | breaking temperature (°C.) | |
| Prior sample | Square | Square | 400 | 400 | 700 | 40 |
| Prior sample | Rectangular | Rectangular | 200 | 200 | 925 | 6 |
| Present invention | Rectangular | Square | 200 | 400 | 900 | 30 |
| Prior sample | A | A | 400 | 400 | 850 | 10 |
| Present invention | A | Square | 400 | 400 | 825 | 32 |
| Prior sample | Square | Square | 500 | 500 | 675 | 50 |
| Prior sample | + - shape | + - shape | 400 | 400 | 900 | 7 |
| Present invention | + - shape | Square | 400 | 500 | 900 | 42 |

Figure 1:
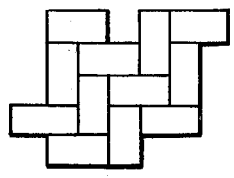
FIGS. 1–7 are partial cross-sectional views of conventional ceramic honeycomb structural bodies.
Figure 2:
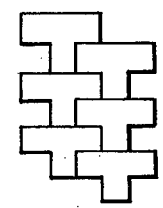
Figure 2A:
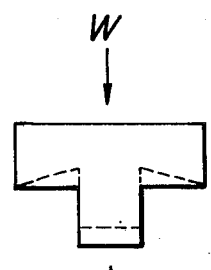
FIGS. 2a, 5a and 7a are enlarged views of one unit of cell structure in FIGS. 2, 5 and 7, respectively.
Figure 3:
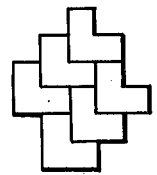
Figure 4:
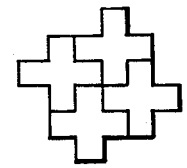
Figure 5:
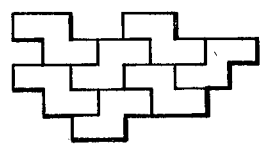
Figure 5A:
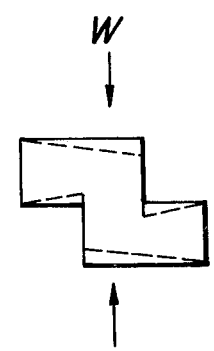
Figure 6:
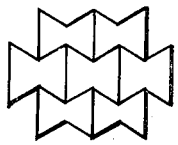
Figure 7:
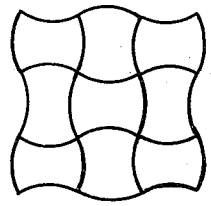
Figure 7A:
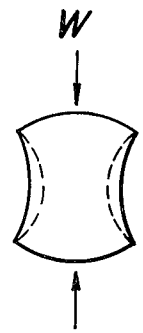
Figure 8:
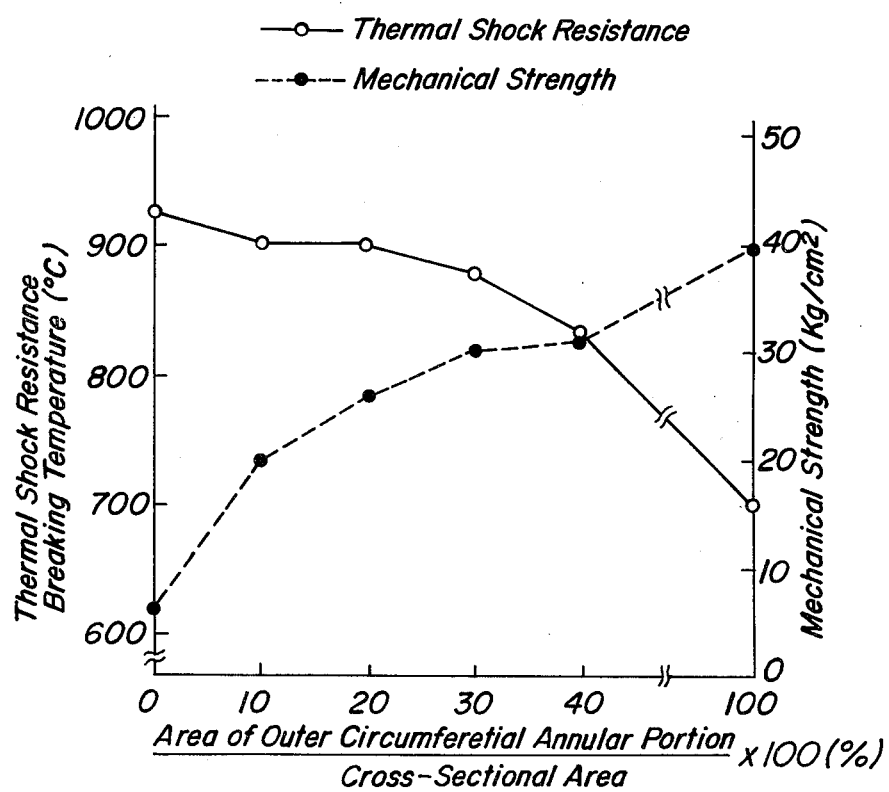
FIG. 8 is a view showing the relation of the thermal shock resistance and mechanical strength to a ratio of the area of the outer circumferential annular portion to the cross-sectional area of the honeycomb structural body.
Figure 9:
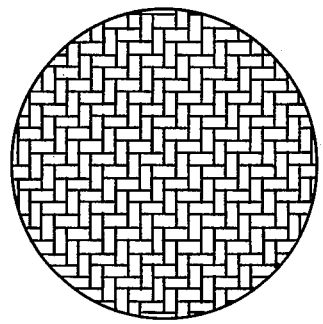
FIGS. 9 and 11 are cross-sectional views of conventional ceramic honeycomb structural bodies.
Figure 10:
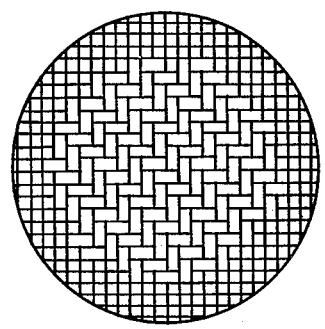
FIG. 10 is one embodiment of cross-sectional view of a ceramic honeycomb structural body of the present invention.
Figure 11:
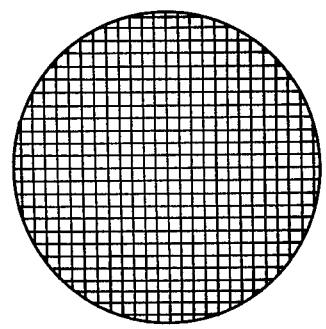

Note:
A: Cell shape shown in FIG. 7.
Any sample of the present invention has an area ratio of outer circumferential annular portion being about 25%.

As seen from these results, the thermal shock resistance of the ceramic honeycomb structural bodies of the present invention may be somewhat inferior to the honeycomb structural bodies in which the cross section is entirely formed of same cells having flexible structure, but it is substantially equal. On the other hand, the mechanical strength is far improved. That is, in the present invention, the cells at the central portion of the cross section of the ceramic honeycomb structural bodies have good flexibility and are a flexible structure, so that the expanding force at the central portion due to the unevenness of the above described temperature distribution is reduced and the thermal stress generated at the outer circumferential portion becomes a low level, even though the outer circumferential annular portion is composed of cell structure having high rigidity and low flexibility. The ceramic honeycomb structural bodies according to the present invention show substantially the same excellent thermal shock resistance as in the ceramic honeycomb structural bodies in which the whole cross section is composed of flexible structure, and even if an external mechanical load is applied to the outer peripheral side wall of the ceramic honeycomb structural body, the outer circumferential annular portion is formed of a cell structure having high rigidity as mentioned above, so that this portion can satisfactorily endure the above described load and a ceramic honeycomb structural body having high mechanical strength can be provided.

As mentioned above, the ceramic honeycomb structural bodies of the present invention have obviated the defects of the ceramic honeycomb structural bodies formed of cells having various flexible structures which are excellent in thermal shock resistance but are poor in mechanical strength and therefore cannot be practically used, and thus, the structural bodies of the present invention are commercially very useful.

What is claimed is:

1. In a ceramic honeycomb structural body having numerous parallel channels separated by thin walls of substantially uniform thickness in which partition walls forming the channels and/or connecting portions of the partition walls are constructed so as to have flexibility, whereby thermal stress generated in the honeycomb structural body is absorbed, the improvement comprises that a given area of the outer circumferential annular portion of said ceramic honeycomb structural body has cells, each having a cell shape having a higher rigidity than the shape of cells of the inner portion.

2. The ceramic honeycomb structural body as claimed in claim 1, wherein the area of the above described annular portion is more than 10% of the cross-sectional area of the ceramic honeycomb structural body.

3. The ceramic honeycomb structural body as claimed in claim 1 or 2, wherein the cross-sectional shape of each of the channels forming the inner portion is rectangular shape, T-shape, L-shape, greek cross-shape, Z-shape, bow-tie-shape, or a combined form of convex partition wall and concave partition wall.

4. The ceramic honeycomb structural body as claimed in claim 1 or 2, wherein the cross-sectional shape of each of the channels forming the above described annular portion is square.

5. A ceramic honeycomb structural body, comprising:

a plurality of parallel channels; and a plurality of thin walls of substantially uniform thickness which separate the plurality of channels and absorb thermal stress, said thin walls comprising a plurality of partition walls which form the channels or connect portions of said partition walls, said partition walls comprising an outer annular portion and an inner central portion, said outer annular portion having a cell cross-sectional shape imparting higher rigidity than that of said inner central portion.

6. A ceramic honeycomb structural body, comprising:

a first plurality of thin flexible walls which absorb thermal stress and are arranged to form a plurality of central parallel channels, each central channel having a cross-sectional rectangular shape, T-shape, L-shape, greek cross-shape, Z-shape, bow-tie-shape, or a combined form of convex and concave shape; and a second plurality of thin flexible walls which absorb thermal stress and are arranged to form an annular plurality of parallel channels, each annular channel having a square cross-sectional shape, the cross-sectional shape of said annular plurality of parallel channels imparting a higher rigidity than the cross-sectional shape of said plurality of central parallel channels, said second plurality of walls forming an outer circumferential annular portion of the ceramic honeycomb structural body which is more than 10% of the cross-sectional area of said body.

7. A ceramic honeycomb structural body as claimed in claim 6, wherein the cross-sectional area of each of said central parallel channels is greater than the cross-sectional area of each of the annular parallel channels.

* * * * *